(12) United States Patent
Autterson

(10) Patent No.: US 7,909,393 B2
(45) Date of Patent: Mar. 22, 2011

(54) RECLOSABLE FASTENER RISER/SPACER, AND METHODS OF CONSTRUCTING AND UTILIZING SAME

(75) Inventor: Christopher S. Autterson, Novi, MI (US)

(73) Assignee: Arcent International, Inc., Plymouth, MI (US)

(*) Notice: Subject to any disclaimer, the term of this patent is extended or adjusted under 35 U.S.C. 154(b) by 0 days.

(21) Appl. No.: 12/712,016

(22) Filed: Feb. 24, 2010

(65) Prior Publication Data

US 2010/0146746 A1 Jun. 17, 2010

Related U.S. Application Data

(63) Continuation of application No. 11/681,060, filed on Mar. 1, 2007, now Pat. No. 7,695,057, which is a continuation-in-part of application No. 11/162,499, filed on Sep. 13, 2005, now Pat. No. 7,390,057.

(60) Provisional application No. 60/609,427, filed on Sep. 13, 2004.

(51) Int. Cl.
*B60R 13/02* (2006.01)
*A44B 18/00* (2006.01)

(52) U.S. Cl. ............ 296/214; 296/39.1; 24/306; 24/444
(58) Field of Classification Search .................. 296/214, 296/39.1, 118, 107.6; 24/442, 306, 444, 24/447

See application file for complete search history.

(56) References Cited

U.S. PATENT DOCUMENTS

| | | | | |
|---|---|---|---|---|
| 4,741,945 A * | 5/1988 | Brant et al. | ............ | 428/158 |
| 5,930,876 A * | 8/1999 | Takizawa et al. | ............ | 24/452 |
| 5,985,407 A * | 11/1999 | Murasaki | ............ | 428/100 |
| 6,523,883 B1 * | 2/2003 | Bergstrom et al. | ............ | 296/184.1 |
| 6,857,809 B2 * | 2/2005 | Granata | ............ | 403/121 |
| 2005/0029837 A1 * | 2/2005 | Stehning et al. | ............ | 296/214 |

* cited by examiner

*Primary Examiner* — Dennis H Pedder
(74) *Attorney, Agent, or Firm* — Weiner & Burt, P.C.; Irving M. Weiner; Pamela S. Burt

(57) ABSTRACT

A plastic spacer/riser to increase useable height of a reclosable fastening system, such as 3M™ Dual Lock™ or Velcro® hook and loop products. The spacer/riser is adapted to be held in place on an external substrate with hot-melt glue, sonic welds, pressure-sensitive adhesives, acrylic foam tape, or screws.

2 Claims, 6 Drawing Sheets

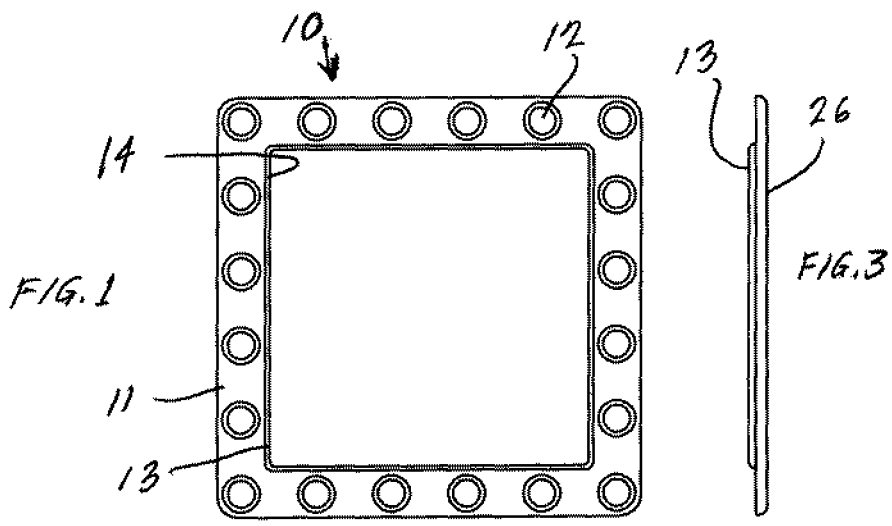
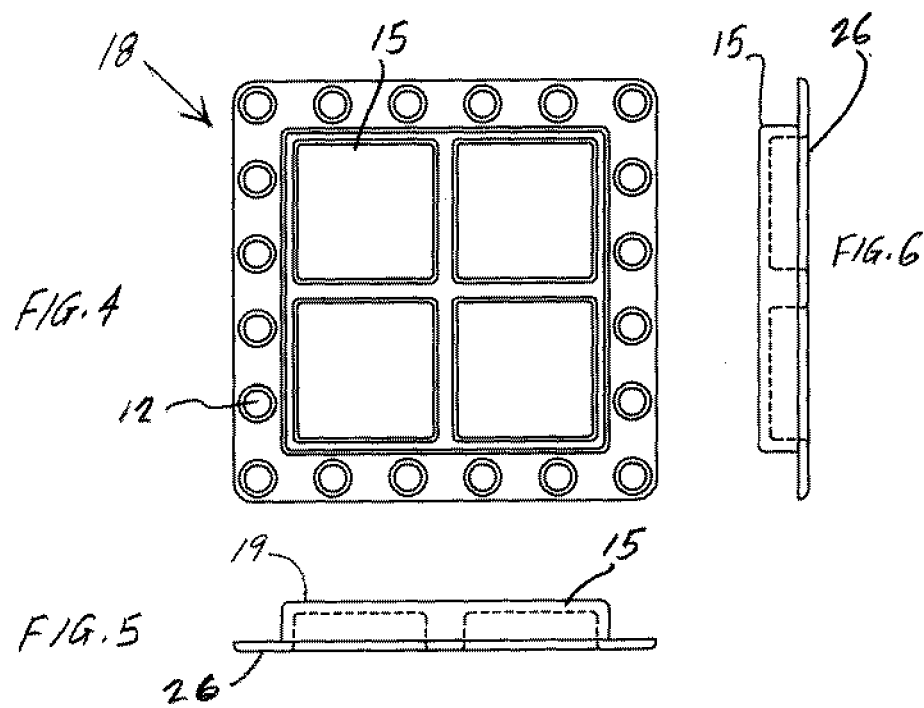
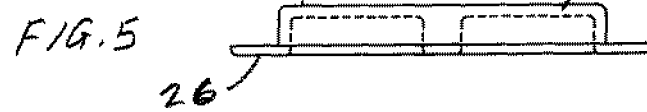
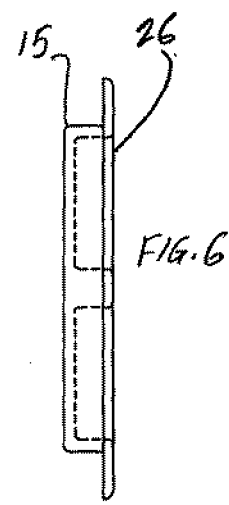

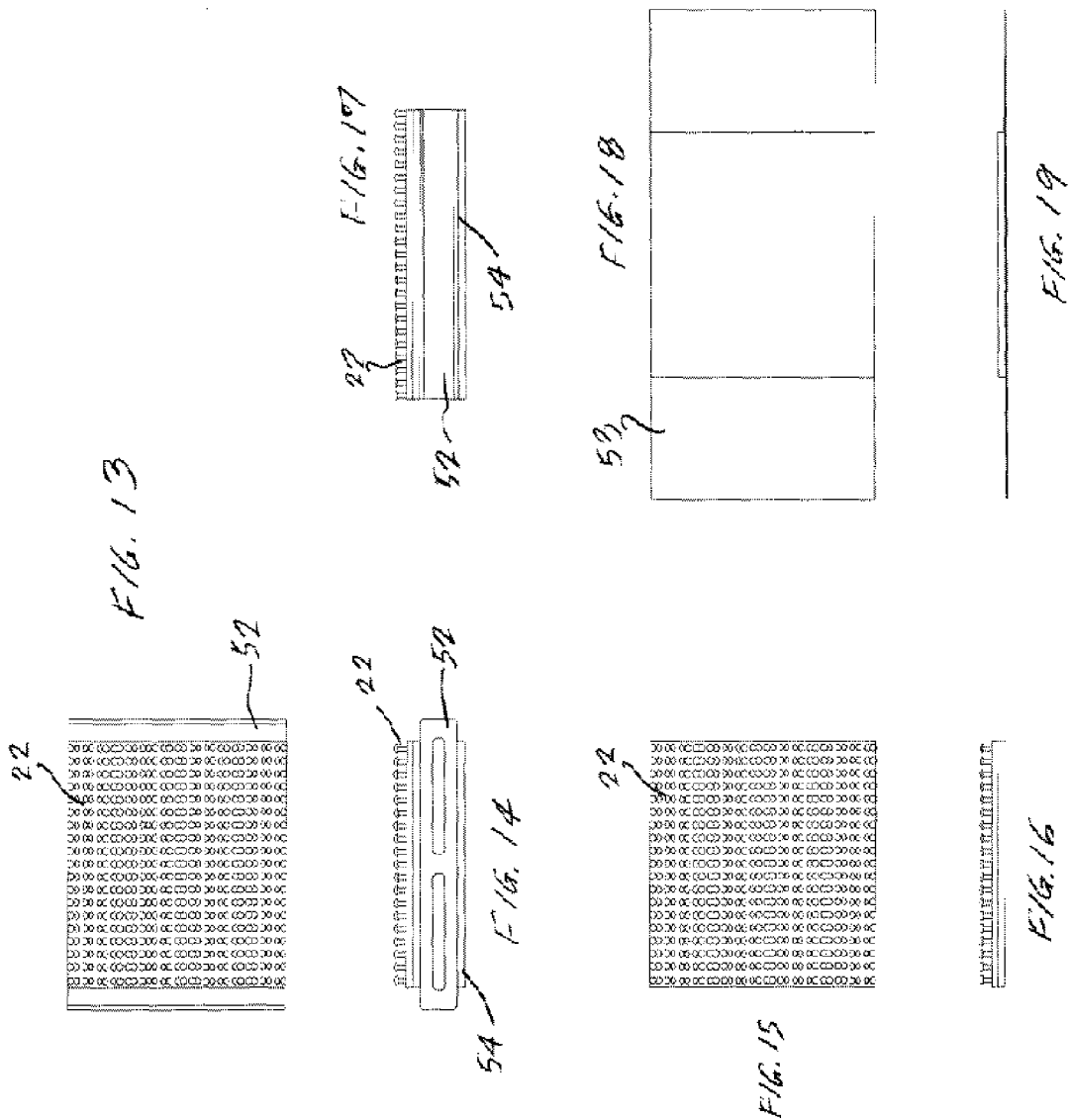

RECLOSABLE FASTENER RISER/SPACER, AND METHODS OF CONSTRUCTING AND UTILIZING SAME

CROSS-REFERENCE TO RELATED APPLICATIONS

The present patent application is a continuation of U.S. patent application Ser. No. 11/681,060 filed Mar. 1, 2007 now U.S. Pat. No. 7,695,057, which in turn is a continuation-in-part of and claims priority from U.S. patent application Ser. No. 11/162,499 filed Sep. 13, 2005 U.S. Pat. No. 7,390,057, which in turn is a continuation in-part of and claims priority from U.S. Provisional Patent Application Ser. No. 60/609,427 filed Sep. 13, 2004, the entire contents of which applications are incorporated herein by reference thereto.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC

Not applicable.

BACKGROUND OF THE INVENTION

The present invention relates generally to a reclosable fastener riser/spacer device, and methods of constructing and using same.

More particularly, the present invention relates to an extruded plastic spacer/riser device to increase the useable height of reclosable fastening systems, such as, for example, 3M™ Dual Lock™ or Velcro® hook and loop products, and methods of constructing and utilizing same.

The term "reclosable fastener" as used herein means 3M™ Dual Lock™ fasteners, Velcro® hook and loop fasteners, and any other fastener that is selectively reclosable.

Typically, reclosable fastening systems, such as, for example, 3M™ Dual Lock™ or Velcro® hook and loop products, are limited in their overall height or thickness in application.

Many times there is a need to increase the overall height or thickness of these fasteners.

For example, when using a reclosable fastener for fastening together the headliner of an automobile and the sheet metal portion roof of the automobile, oftentimes there is a space or gap between the parts of the reclosable fasteners which might necessitate the pushing in of the headliner, resulting in an uneven look with creases and folds and the like.

The present invention provides a device to increase the overall height, allowing more versatility in the use of reclosable fasteners in many different applications.

It is a desideratum of the present invention to avoid the animadversions of conventional reclosable fastening systems which are limited in their overall height or thickness in application.

BRIEF SUMMARY OF THE INVENTION

The present invention provides a riser/spacer device for use with a reclosable fastener, comprising, in combination: a riser/spacer device a having a first predetermined overall height, and first and second predetermined portions; a reclosable fastener having a second predetermined overall height, and selectively closable and releasable first and second mating portions; said first mating portion of said reclosable fastener being secured to said first predetermined portion of said riser/spacer device; said first predetermined overall height of said riser/spacer device plus and said second predetermined overall height of said reclosable fastener being determined by a gap to be filled between first and second external substrates; said second predetermined portion of said riser/spacer device being connected, directly or indirectly, to said first external substrate; and said second mating portion of said reclosable fastener being connected, directly or indirectly, to said second external substrate.

The present invention also provides a method of fabricating a riser/spacer device, comprising the steps of: softening plastic in an extruder as said plastic is forced though said extruder by an extruder screw toward a die; shaping said softened plastic in said die; holding the shape of said plastic with shaping tooling and guides as said softened shaped plastic exits said die in a continuous length until said softened shaped plastic is cooled and set to a required shape and dimensions of said riser/spacer device; and maintaining the size of the plastic riser/spacer device by a ratio between the amount of plastic being forced through said die and the speed of a haul off apparatus pulling the plastic riser/spacer device away from said die and through shaping tooling and guides.

The invention also provides a riser/spacer device which includes first and second mating channel members which are designed and dimensioned to be slidably assembled and disassembled together; and said first and second mating channel members are disposed between said first mating portion of said reclosable fastener and said first external substrate.

The present invention further provides an extruded spacer/riser device as described hereinabove to increase the useable height of reclosable fastening systems, such as, for example, 3M™ Dual Lock™ or Velcro® hook and loop products.

It is a primary object of the present invention to provide a reclosable fastener riser/spacer product as described hereinabove, wherein such riser/spacer product may be fabricated by extrusion out of materials such as ABS, polypropylene, polyethylene, or any suitable material.

Another object of the present invention is to provide such a riser/spacer device as described hereinabove, which allows reclosable fastening systems to have more versatility in applications.

Another object of the present invention is to provide such a riser/spacer device as described hereinabove, wherein the riser/spacer device is designed to be held in place on a substrate with hot-melt glue, sonic welding, pressure sensitive adhesive, acrylic foam tape, screws, or other securement means.

The foregoing objects, advantages and features of the present invention will become apparent to those persons skilled in this particular area of technology and to other persons after having been exposed to the following detailed description of the present invention and when read in conjunction with the accompanying patent drawings.

For a better understanding of the present invention, and to show more clearly how it may be carried into effect, reference will now be made, by way of example, to the accompanying drawings, which show some preferred embodiments of the present invention.

BRIEF DESCRIPTION OF THE SEVERAL VIEWS OF THE DRAWINGS

FIG. 1 illustrates a top plan view of a spacer/riser device in accordance with a first embodiment of the invention.

FIG. 2 shows a front elevational view of the FIG. 1 device.

FIG. 3 shows a side elevational view of the FIG. 1 device.

FIG. 4 illustrates a bottom view of the FIG. 1 device.

FIG. 5 is a view similar to FIG. 2 but showing the internal structure of the spacer in phantom line.

FIG. 6 is a view similar to FIG. 3 but showing the internal structure of the spacer in phantom line.

FIG. 13 depicts a bottom view of the FIG. 12 device.

FIG. 14 is a front view of the FIG. 12 device inverted.

FIG. 15 is view of the unassembled dual-lock fastener of FIGS. 12-14.

FIG. 16 shows the FIG. 15 fastener on acrylic foam tape.

FIG. 17 is a side view of FIG. 14.

FIG. 18 shows a top view of the unassembled acrylic foam tape of the FIG. 11 device.

FIG. 19 is a front view of FIG. 18.

DETAILED DESCRIPTION OF THE INVENTION

Figure 7:
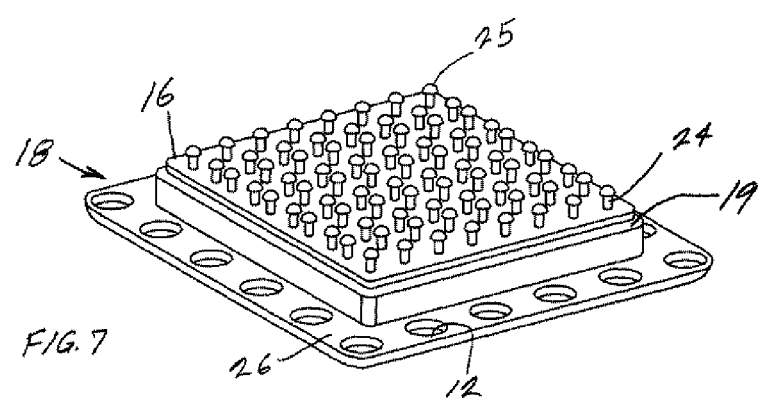
FIG. 7 is an isometric drawing showing the device having affixed thereon one portion of a 3M™ Dual Lock™ reclosable fastener.

Similar components in the various embodiments are designated by the same reference numbers, unless indicated otherwise.

The invention provides a riser/spacer device 18 for use with a reclosable fastener 17, wherein: the riser/spacer device has a first predetermined overall height, and first and second predetermined portions 19 and 26; the reclosable fastener 17 has a second predetermined overall height, and selectively closable and releasable first and second mating portions 16 and 22; said first mating portion 16 of said reclosable fastener 17 being secured to said first predetermined portion 19 of said riser/spacer device 18; said first predetermined overall height of said riser/spacer device 18 plus and said second predetermined overall height of said reclosable fastener 17 being determined by a gap to be filled between first and second external substrates 20 and 23; said second predetermined portion 26 of said riser/spacer device 18 being connected to said first external substrate 20; and said second mating portion 22 of said reclosable fastener 17 being connected to said second external substrate 23.

With reference to FIGS. 1-8, there is illustrated a first embodiment of the present invention in the form of an unitarily-molded riser/spacer device 18 having a main spacer retainer member 10 and a spacer 15.

Preferably, but not necessarily, the main spacer retainer member 10 is provided around its outer periphery 11 with a series of apertures 12.

Figure 8:
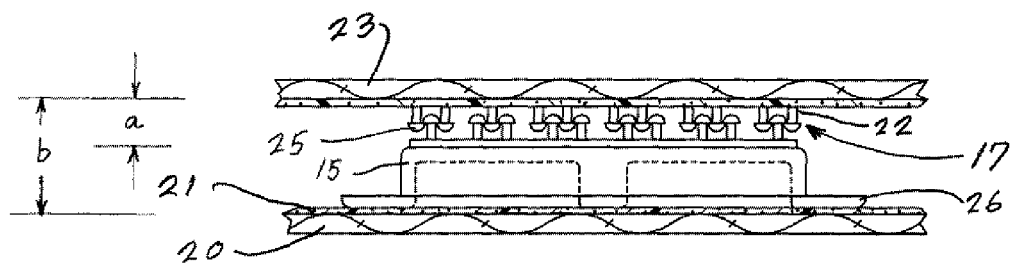
FIG. 8 shows a side elevational view, partly in section, of the riser/spacer device of the present invention as used with a particular reclosable fastener system.

The main spacer retainer member 10 is provided with a predetermined portion or base member 26 having a lower surface 27, as best shown in FIG. 8.

The main spacer retainer member 10 surrounds one or more spacer members 15, the height of which is dependent upon the increase in height or gap to be filled between external substrates 20 and 23.

Preferably, but not necessarily, the device 18 is injection molded from materials such as ABS, polypropylene, polyethylene, or other plastics.

With reference to FIG. 7, there is shown the device 18 having affixed at a predetermined portion or top surface 19 thereof a first mating portion 16 of a reclosable fastener 17, such as a 3M™ Dual Lock™ reclosable fastener.

With reference to FIG. 8, there is shown the device 18 having the lower surface portion 27 of its base number 26 secured to a first external substrate 20, such as the sheet metal roof of an automobile, by hot-melt glue, sonic welding, pressure-sensitive adhesive, or other securement means 21.

A second portion 22 of the reclosable fastener 17, such as a 3M™ Dual Lock™ reclosable fastener, is secured to a second external substrate 23, such as, for example, the headliner of an automobile by hot-melt glue, sonic welding, pressure-sensitive adhesive, or other securement means 28.

With reference to FIGS. 7 and 8, the purpose of the apertures 12 in the main spacer retaining member 10 is to permit hot-melt glue or other adhesive to move therethrough, or screws to pass therethrough, when securing member 10 to an external substrate 20.

With reference to FIG. 8, the 3M™ Dual Lock™ reclosable fastener 17 will operate in the normal fashion with the mushroom heads 25 on the rigid plastic stems 24 releasably interlocked. The 3M™ Dual Lock™ reclosable fasteners 17 are self-mating, that is the fasteners 17 simply reattach to themselves. When pressed together, thousands of mushroom heads 25 interlock with one another creating an audible snap that announces that the fastener portions 16 and 22 are interlocked.

Figure 9:
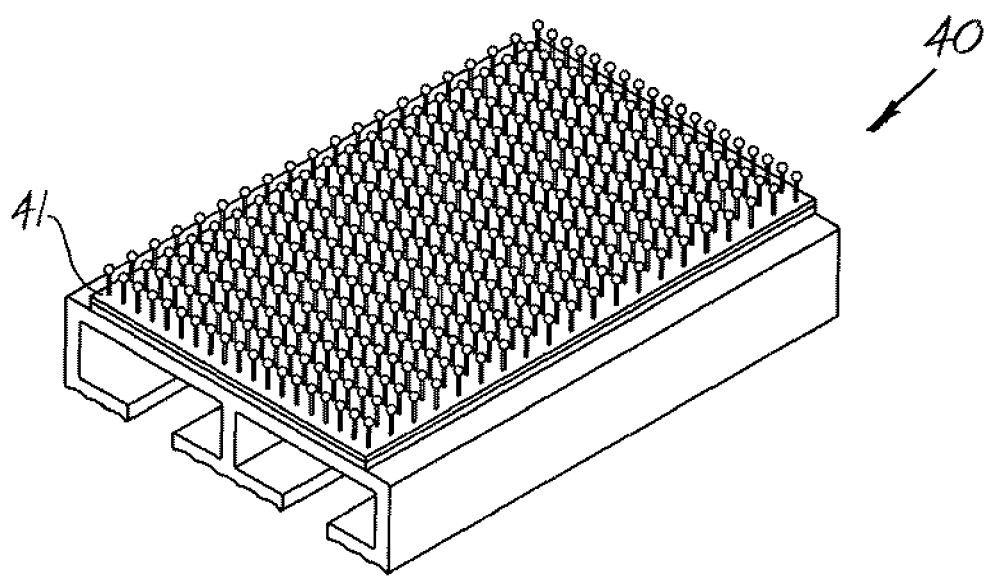
FIG. 9 illustrates a perspective view of a second embodiment of the invention.
Figure 10:
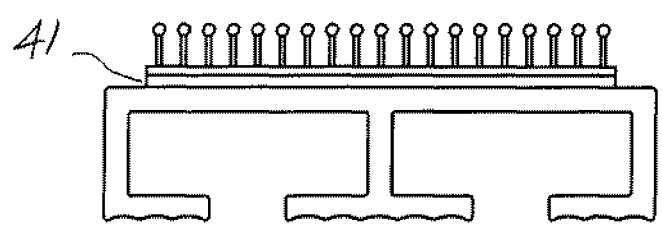
FIG. 10 shows an end view of the FIG. 9 embodiment.

FIGS. 9 and 10 a riser/spacer device 40 in accordance with a second embodiment of the invention.

The riser/spacer device 40 is made by an extrusion process as described hereinbelow.

In the extrusion process in accordance with the present invention, the plastic from which the device 40 is made has to be softened so it can be shaped. This can be done by any suitable means, such as, for example, by applying heat.

In accordance with the invention, this softening of the plastic takes place in an extruder as the plastic is forced toward and through a die by an extruder screw. The shape is imparted to the plastic by the die.

Once the plastic exits the die in a continuous length, it is held or maintained in shape with shaping tooling and guides until the plastic material can be cooled and set to the required shape.

The size of the plastic part is maintained by a ratio between the amount of plastic being forced through the die and the speed of an haul off apparatus which pulls the part away from the die and through the shaping tooling.

After the part shape has been set, any number of process steps can be done to the part while it is still in a continuous length and before it passes through the haul off apparatus. In the case of the riser/spacer device 40, these process steps may preferably, but not necessarily, include applying promoter, applying a portion 41 (similar to portion 16 described above) of a reclosable fastener 17, and applying a part identification.

Once the part is beyond the haul off apparatus, it may be cut to the required length, yielding the finished part.

With reference to FIGS. 9 and 10, the riser/spacer device 40 includes a reclosable fastener somewhat similar to the reclosable fastener 17 described above in connection with FIGS. 7 and 8. The reclosable fastener 17 has a predetermined overall height "a" (as shown in FIG. 8), and a selectively closable and releasable first and second mating portions.

Also, as shown in FIG. 8, the predetermined overall height of the riser/spacer device plus and the predetermined overall height "a" of the reclosable fastener is determined by a gap "b" to be filled between first and second external substrates 20 and 23.

As shown in FIG. 8, a mating portion 22 of the reclosable fastener 17 is secured to an external substrate 23.

The mating portion 41 (FIGS. 9 and 10) is similar to the mating portion 16.

Figure 11:
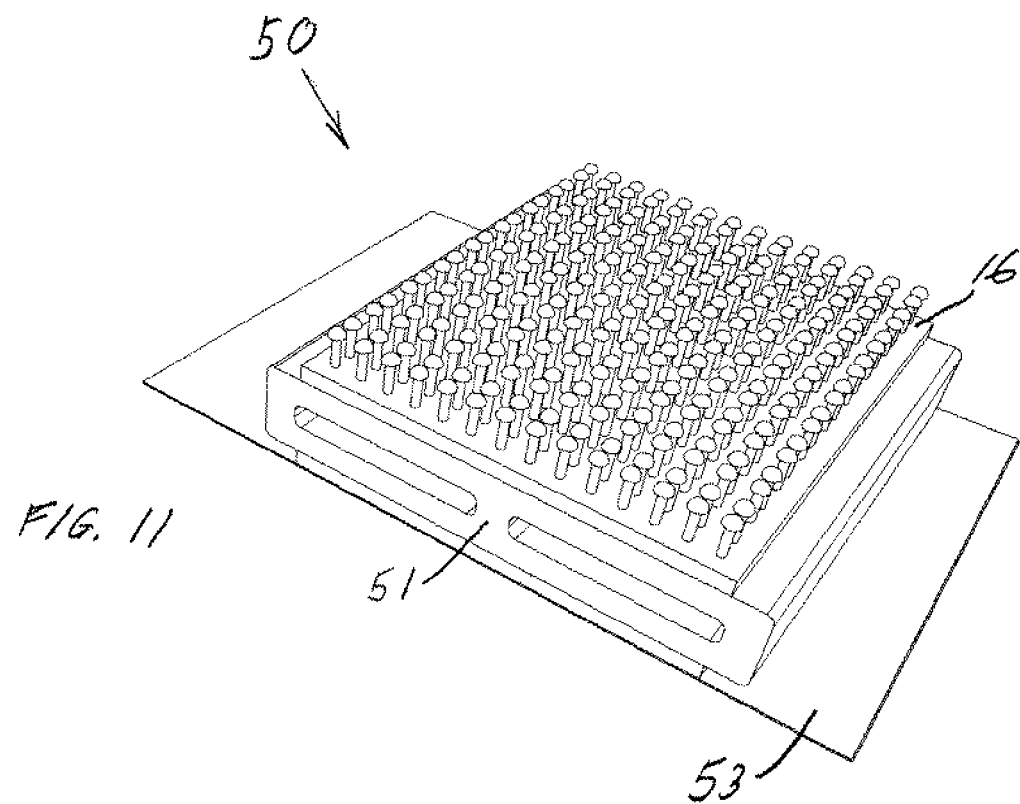
FIG. 11 illustrates a third embodiment.

FIGS. 11-19 illustrate a third embodiment 50 having first and second riser/spacer devices 51 and 52, and a reclosable fastener 17. FIG. 11 show mating portion 16 of fastener 17 mounted on spacer 51, which in turn is mounted on acrylic foam tape member 53.

Figure 12:
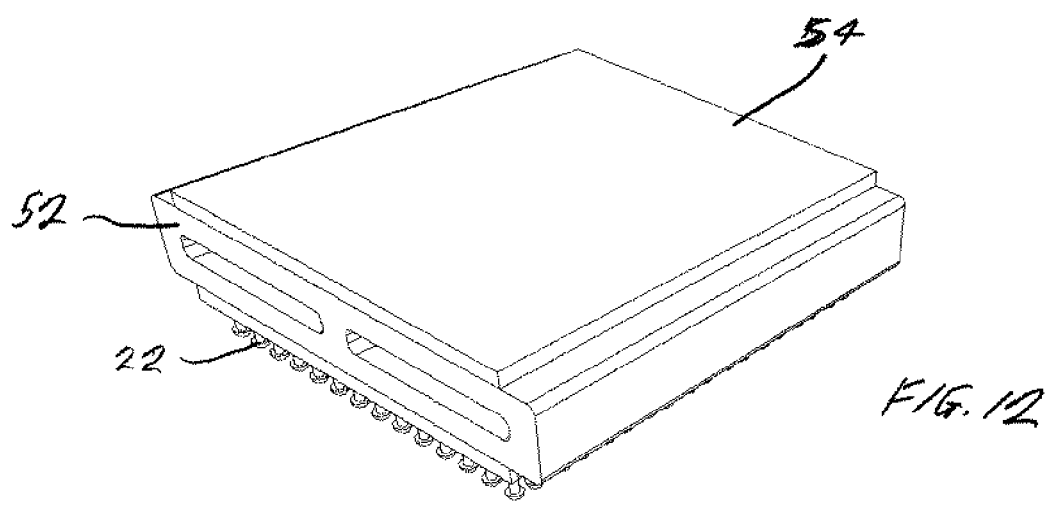
FIG. 12 shows a device for mating with the FIG. 11 embodiment.

FIG. 12 shows the device for mating with the FIG. 11 device. FIG. 12 shows mating portion 22 of fastener 17 secured to spacer 52, which in turn is secured to acrylic foam tape member 54.

FIG. 13 depicts a bottom view of the FIG. 12 device.

FIG. 14 is a front view of the FIG. 12 device inverted.

FIG. 15 is view of the unassembled dual-lock fastener of FIGS. 12-14.

FIG. 16 shows the FIG. 15 fastener on acrylic foam tape.

FIG. 17 is a side view of FIG. 14.

FIG. 18 shows a top view of the unassembled acrylic foam tape of the FIG. 11 device.

FIG. 19 is a front view of FIG. 18.

Figure 20:
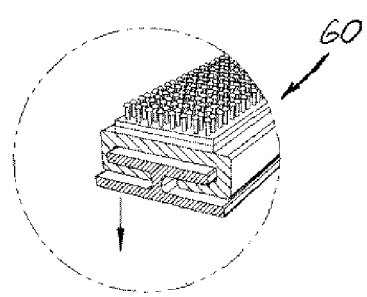
FIG. 20 is a partial perspective view of a fourth embodiment of the invention.

FIG. 20 is a partial perspective view of a fourth embodiment 60 of the invention.

Figure 21:
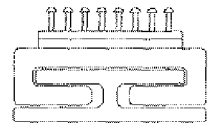
FIG. 21 is front view of FIG. 20.

FIG. 21 is front view of FIG. 20.

Figure 22:
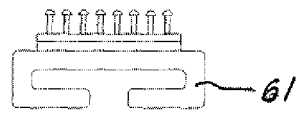
FIG. 22 is a front view of a first channel portion of FIG. 20.

FIG. 22 is a front view of a first channel portion 61 of FIG. 20.

Figure 23:
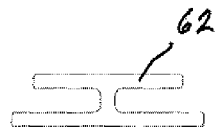
FIG. 23 is a front view of second channel portion which mates with FIG. 22 device.

FIG. 23 is a front view of second channel portion 62 which mates with the FIG. 22 device.

Figure 24:
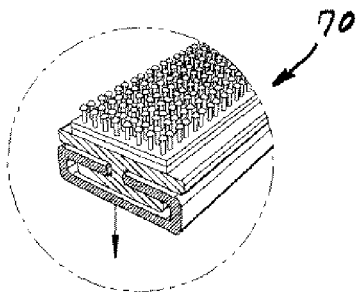
FIG. 24 is a partial perspective view of a fifth embodiment of the invention.

FIG. 24 is a partial perspective view of a fifth embodiment 70 of the invention.

Figure 25:
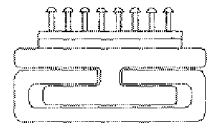
FIG. 25 is front view of FIG. 24.

FIG. 25 is front view of FIG. 24.

Figure 26:
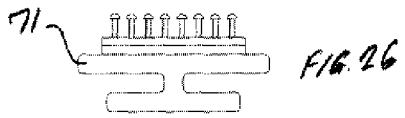
FIG. 26 is a front view of a first channel portion of FIG. 24.

FIG. 26 is a front view of a first channel portion 71 of FIG. 24.

Figure 27:
FIG. 27 is a front view of second channel portion which mates with FIG. 26 device.

FIG. 27 is a front view of second channel portion 72 which mates with the FIG. 26 device.

With reference to the fourth and fifth embodiments 60 and 70, respectively, it should be noted that the device includes first and second mating channel members which are designed and dimensioned to be slidably assembled and disassembled together; and said first and second mating channel members are disposed between said first mating portion of said reclosable fastener and said first external substrate.

While the present invention has been described hereinabove with respect to several preferred embodiments for illustrative purposes only, it should be understood that the present invention encompasses and embraces all modifications, variations, and changes in the basic inventive concept.

Also, the variations and modifications are intended to be embraced within the scope of the present invention and the patent claims set forth hereinbelow.

The invention claimed is:

1. A riser/spacer device for use with a reclosable fastener, comprising, in combination:
   a reclosable fastener having a predetermined overall height, and selectively closable and releasable first and second mating portions;
   said reclosable fastener comprises strips of flexible plastic covered with interlocking heads which fasten securely when pressed together;
   a first rigid, one-piece, non-deformable, non-flexible riser/spacer member having a rectangular parallelepiped shape with a pair of parallel rectangular tubular hollow portions extending therethrough;
   said first mating portion of said reclosable fastener being secured to a first major planar surface of said first rigid, one-piece, non-deformable, non-flexible riser/spacer member;
   a first acrylic foam tape member secured to a second major planar surface of said first rigid, one-piece, non-deformable, non-flexible riser/spacer member;
   said second major planar surface is parallel to and opposite said first major planar surface;
   said first acrylic foam tape member extends beyond said first rigid, one-piece, non-deformable, non-flexible riser/spacer member to provide wing portions on both ends of said first rigid, one-piece, non-deformable, non-flexible riser/spacer member;
   a second rigid, one-piece, non-deformable, non-flexible riser/spacer member having a rectangular parallelepiped shape with a pair of parallel rectangular tubular hollow portions extending therethrough;
   said second mating portion of said reclosable fastener being secured to a first major planar surface of said second rigid, one-piece, non-deformable, non-flexible riser/spacer member;
   a second acrylic foam tape member secured to a second major planar surface of said second rigid, one-piece, non-deformable, non-flexible riser/spacer member;
   said second major planar surface of said second riser/spacer member is parallel to and opposite said first major planar surface of said second riser/spacer member;
   when said strips of flexible plastic covered with interlocking heads are fastened securely pressed together, the overall height of all of the above-mentioned components is determined by a gap to be filled between first and second substrates;
   said first acrylic foam tape member is secured to said first substrate; and
   said second acrylic foam tape member is secured to said second substrate.

2. A riser/spacer device according to claim 1, wherein:
   said first and second substrates comprise a roof of a vehicle and a headliner of said vehicle.

* * * * *